US005457592A

United States Patent [19]

Smith

[11] Patent Number: 5,457,592
[45] Date of Patent: * Oct. 10, 1995

[54] MINIATURE STATION PROTECTOR MODULES WITH AN INTERNAL PROTECTOR HOUSING

[75] Inventor: Thomas J Smith, Bay Shore, N.Y.

[73] Assignee: TII Industries, Inc., Copiague, N.Y.

[ * ] Notice: The portion of the term of this patent subsequent to Jun. 29, 2010 has been disclaimed.

[21] Appl. No.: 17,597

[22] Filed: Feb. 16, 1993

[51] Int. Cl.[6] ................................ H02H 1/04; H02H 3/22

[52] U.S. Cl. ............................ 361/119; 361/111; 361/126

[58] Field of Search .................................... 361/110, 111, 361/118, 119, 120, 126

[56] References Cited

U.S. PATENT DOCUMENTS

| | | | |
|---|---|---|---|
| 4,161,762 | 7/1979 | Scheithauer | 361/119 |
| 4,333,121 | 6/1982 | Schwarz | 361/119 |
| 4,675,778 | 6/1987 | Cwirzen | 361/119 |
| 5,155,649 | 10/1992 | Hung et al. | 361/119 |
| 5,175,662 | 12/1992 | DeBalko et al. | 361/119 |
| 5,224,013 | 6/1992 | Pagliuca | 361/119 |

*Primary Examiner*—A. D. Pellinen
*Assistant Examiner*—Ronald W. Leja
*Attorney, Agent, or Firm*—Martin Sachs

[57] ABSTRACT

A miniature station protector module for communication systems includes a hollow housing having a top surface and open bottom. A pair of line terminals and ground terminals are disposed in the housings top surface and extend inside the hollow housing, with the ground terminal disposed intermediate the pair of line terminals. A non-conductive printed circuit board with conductive paths thereon is affixed to the pair of line terminals and the ground terminal. A holding assembly is affixed to the ground terminal within the hollow housing and is adapted to receive a surge arrester therein. The surge arrester has at least a pair of electrodes and a ground terminal, with the ground terminal being an electrically conductive contact with the housing ground terminal, each one of the pair of surge arrester electrodes are in electrically conductive contact with one of the pair of line terminals. A protective housing circumscribes the surge arrester and portions of the holding assembly. A potting compound is used to fill the hollow housing excluding the areas protected by the internal protector housing thereby protecting the surge arrester from contamination from the encapsulating material and the environment.

4 Claims, 2 Drawing Sheets

MINIATURE STATION PROTECTOR MODULES WITH AN INTERNAL PROTECTOR HOUSING

BACKGROUND OF THE INVENTION

1. Field of Invention

The present invention relates to modular overload protectors for communication systems, and in particular, to modules that include; overvoltage protection utilizing solid state devices and line identification.

2. Discussion of the Relevant Art

In communication systems, such as telephone systems, it is necessary to position overload protectors at various positions to protect sensitive parts of the system and to protect equipment connected to the line from lightning strikes or other causes of overvoltage appearing on the communication lines. Typically these overvoltage protection devices incorporated the carbon block type which provided parallel air gaps. However, the carbon block protector during normal operation on the communication line could cause static to appear on the line and thus, the gas tube type surge protectors replaced them. These devices generally used back up protection, which utilized thermally sensitive plastics that were assembled with spring pressure on them and thus, when overheated would yield and short the communication terminal line to ground.

With the inherent desire to protect the communication equipment several different types of protectors have been used over the years, each including thermally active members, which when overheated cause the line terminals to short to ground. Initially the thermally sensitive material was a low temperature melting solder pellet, which when melted because of the extreme heat caused by an overvoltage, would permit the assembly in some manner to short the line terminal to ground. Further improvements in the state of the art replaced the solder pellet used with the gas filled tube. Still further improvements of the protection devices, which proved to be more reliable, utilized a back-up air gap together with the thermally sensitive material for overheating protection in the assemblies that provides provide protection of the line if the gas tube associated therewith for some reason vented its gas.

However, all of the devices known in the prior art required that the technician in replacing any of the components after a lightning strike or overvoltage condition to carefully replace the components as it was originally assembled so that the protection would be restored. This type of assembly work performed in the field proved to be a handicap and thus, it was found more desirable to provide a device which is completely sealed and when it has provided its useful protection, is just thrown away and replaced with a new unit. This, of course, became feasible only with the advent of inexpensive thermally sensitive plastics and/or inexpensive solid state protection devices together with a new type of construction which reduced the cost of the protection device.

However, it has been determined that the sealing material sometimes referred to as a potting or encapsulating material, generally composed of some type of epoxy compound was found to interfere with the operation of the solid state surge arrester thereby making the apparatus less reliable so that a protective housing was needed to protect the solid state surge arresters from contamination.

Therefore, it is an object of the present invention to provide a miniature station protector module for communication systems which is completely sealed and may be disposed of once it has served its purpose for protecting the communication line.

It is another object of the present invention to provide a miniature station protector module which combines all of the features of the earlier type devices including fail-safe shorting, highly stable and efficient, as well as being inexpensive to manufacture.

It is still a further object of the present invention to provide a miniature station protector module which utilizes a solid state protector device.

It is yet another object of the present invention to provide a miniature station protector module, as described above, which further includes a protective housing to protect the solid state surge protector from contamination because it comes into contact with the sealing or potting material.

The foregoing and other objects and advantages will appear from the description to follow. In the description reference is made to the accompanying drawing which forms a part hereof and in which is shown by way of illustration a specific embodiment in which the invention may be practiced. These embodiments will be described in sufficient detail to enable those skilled in the art to practice the invention, and it is to be understood that other embodiments may be utilized and that structural changes may be made without departing from the spirit and scope of the invention. The following detailed description is, therefore, not to be taken in a limited sense, and the scope of the present invention is best defined by the appended claims.

SUMMARY OF THE INVENTION

A miniature station protector module for communication systems, according to the principles of the present invention comprises a hollow housing having a top surface and an open bottom. A pair of line terminals and a ground terminal are disposed in the housing top surface and extend inside the hollow housing, the ground terminal is intermediate between the pair of line terminals. A non-conducting printed circuit board, with conductive pads thereon, is affixed to the pair of line terminals insulated from ground by a heat sensitive material, and the housing ground terminal. A holding assembly is affixed to the housing ground terminal within the hollow housing and it is adapted to receive a surge arrester. The surge arrester has at least a pair of electrode terminals and a ground terminal. The surge arrester ground terminal is in electrically conductive contact with the housing ground terminal. Each one of said pair of surge arrester electrode terminals are in electrically conductive contact with one of the pair of line terminals. A protective housing circumscribes the surge arrester and portions of the holding assembly thus, when a potting compound is used to fill the hollow housing, sealing it, the area protected by the protective housing does not permit the potting compound to contaminate the solid state surge arrester.

BRIEF DESCRIPTION OF THE DRAWING

In order that the invention may be more fully understood, it will now be described, by way of example, with reference to the accompanying drawing in which.

DESCRIPTION OF THE PREFERRED EMBODIMENT

Figure 1:
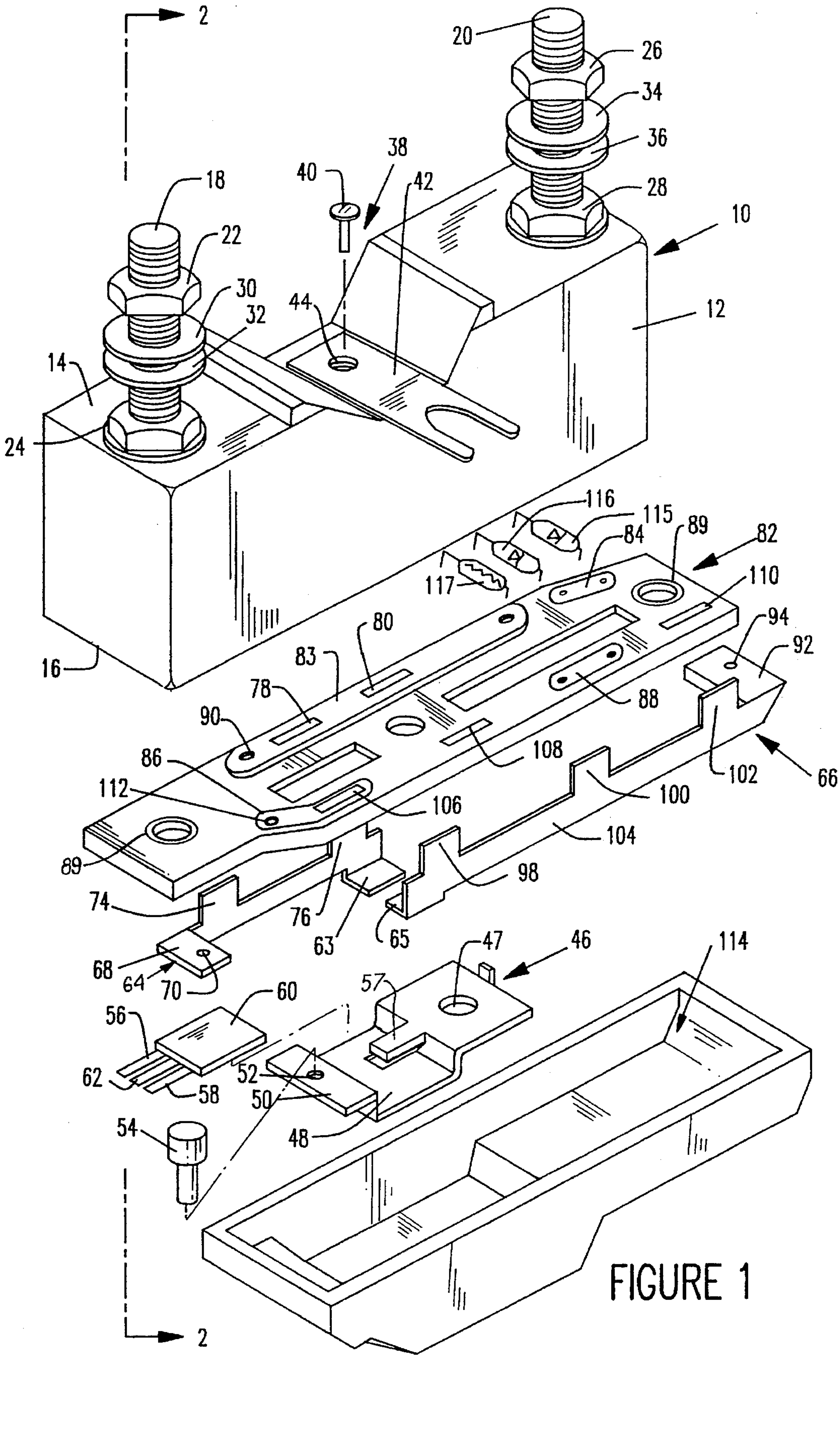
FIG. 1 is an exploded isometric view, according to the principles of the present invention, of a miniature station protector module including a protective housing surrounding the surge arrester and including line termination identification.
Figure 2:
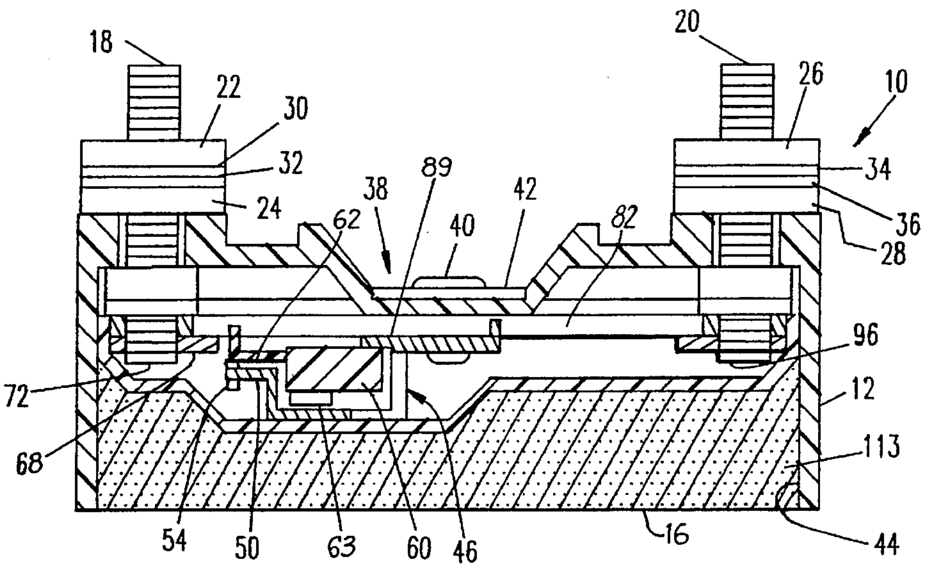
FIG. 2 is a cross-sectional view taken along the line 2—2 of FIG. 1.

Referring now to the figures, and in particular, to FIGS. 1 and 2 in which is shown a miniature station protector module 10, according to the principles of the present invention, that includes a hollow housing 12 having a closed top surface 14 and an open bottom 16. Disposed on the top surface of the housing 12 are a pair of line terminals 18 and 20 on to which are connected the telephone companies communication lines, not shown, by means of nuts 22, 24, 26 and 28 and a plurality of flat washers 30, 32, 34 and 36, in a conventional manner. Disposed between the line terminals 18 and 20 is a ground terminal 38, which preferably includes rivet 40 and ground tab 42 suitable for connection to a system ground, not shown. The ground terminal rivet 40 extends into the hollow or cavity 44 of the housing 12. Preferably the rivet 40 enters aperture 47 and when peened over in a conventional manner, retains bracket 46 to the housing 12.

The bracket 46 is provided with an extending portion 48 that terminates in a lip portion 50. The lip portion 50 of bracket 46 is provided with an aperture 52 into which fusible plug (thermoplastic insulator) 54 is retained. Fusible plug 54 is designed to melt upon overheating by excessive current being carried by the overvoltage protection device 60, thereby forcing the lip portion 50 to short the electrode terminal leads 56 and 58 of the solid state overvoltage device 60, which preferably is a multiple bidirectional type thyristor such as manufactured by Teccor Pat. No. TO-220. When plug 54 melts portion 48 of clip 46 shorts to tabs 63 and 65 on brackets 64 and 66, respectively, thereby terminals 56 and 58 are shorted indirectly. The ground terminal 62 of the solid state overvoltage device is permitted to be in electrical conductive contact with fusible plug 54 when the unit is completely assembled, thereby making electrically conductive contact with the ground terminal, via the bracket 46, rivet 40 and ground tab 42. The brackets 64 and 66 and the finger clip extension 57 provided on bracket 46 secure device 60 to the printed circuit board 82.

Bracket 64 is provided with an extending portion 68 with an aperture 70 suitable to receive the internally protruding end 72 (see FIG. 2) of terminal 18 and is designed to retain bracket 64 in position in a conventional manner. Bracket 64 is also provided with feet 74 and 76 which are adapted to be received through apertures 78 and 80 provided on printed circuit board 82.

Printed circuit board 82 is made of a non conducting material having numerous electrically conducting paths 83, 84, 86, 88 and 89 provided thereon. When bracket 64 is inserted into apertures 78 and 80 it is placed in electrically conductive contact with conductor path 83, in a conventional manner, such as by using solder. Terminal lead 56 of the solid state overvoltage protector 60 is bent and inserted into aperture 90 and connected to conductor path 83 on printed circuit board 82 and thus is connected to terminal 18, via bracket 64.

Bracket 66 is provided with an extending portion 92 which is provided with an aperture 94 adapted to receive the end 96 of terminal 20 (see FIG. 2) and it is held in position thereto, in a conventional manner. Feet 98, 100 and 102 are provided on an elongated portion 104 of bracket 66 that are adapted to be received into apertures 106, 108 and 110, respectively. The foot 98 is adapted to be received into aperture 106, which is surrounded by conducting path 86, electrode terminal 58 is bent and inserted into aperture 112 and is soldered, in a conventional manner. Foot 102 is adapted to be received into aperture 110 which is also soldered to conductive path 89. Thus, bracket 66 makes electrically conductive contact with line terminal 20 and bracket 64 makes electrically conductive contact with terminal 18.

The electrode terminal lead 62 of the solid state overvoltage device 60 is bent preferably at a right angle and is pressed against the printed circuit board and is in electrically conductive contact with fusible plug 54, thereby ground terminal 62 is connected to ground and the outward electrode terminal leads 56 and 58 are connected to one terminal of the line terminal 18 and 20, respectively.

When the brackets 64 and 66 are fixed to the line terminals 18 and 20 they also have the printed circuit board 82 fixed in position therebetween.

A cover 114 is placed over the holding brackets 64 and 66 on the printed circuit board 82, thus preventing them from coming into contact with the potting compound 113, which is poured into the hollow housing 12, via the open bottom 16, once the assembly has been made and the protective cover 114 is placed over the components thereby preventing any functional interference of the overvoltage protective because of contamination by the potting compound 113.

Figure 3:
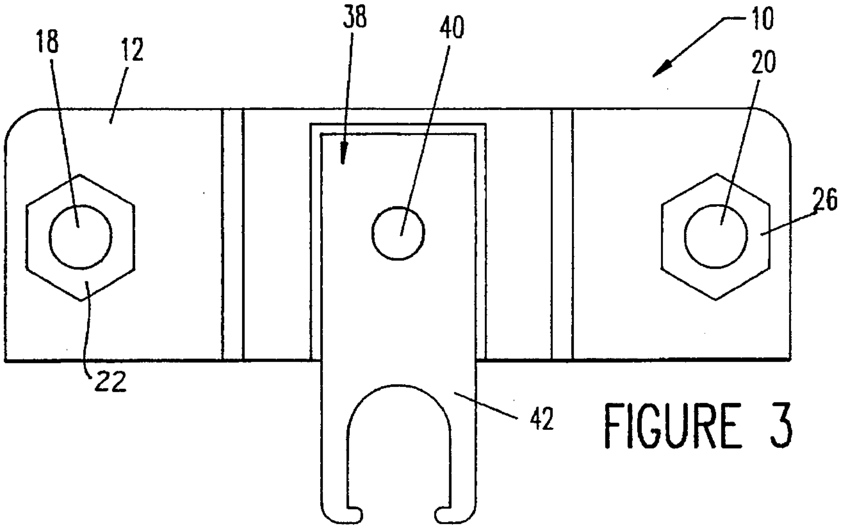
FIG. 3 is a top plan view of the miniature station protector module.

The top plan view of the miniature surge protector is shown in FIG. 3 in which the terminals 18 and 20 and ground terminal 38 are connected to the incoming telephone lines, not shown.

Figure 4:
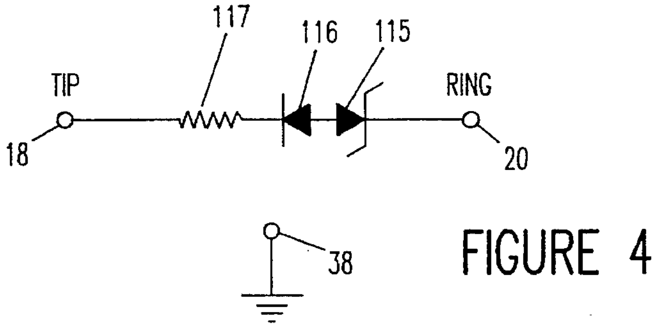
FIG. 4 is an electrical circuit schematic diagram of a line termination identification circuit arrangement.

Referring now to FIG. 4, which discloses the line termination identification circuit arrangement that includes a zener diode 115 connected in series with a conventional diode 116 and a resistor 117. Zener diode 115 has its cathode connected to ring terminal 20. The anode of zener diode 115 is connected to the anode of diode 116 and the cathode of diode 116 is connected to resistor 117, which has its other end connected to the tip terminal 18. Therefore, as shown, a series circuit path from the tip terminal 18 to the ring terminal 20 is provided which will not interfere with the telephone operation whether it be on hook or off hook. The circuit arrangement does provide for an identification of a particular telephone line on which the circuit arrangement is placed. Preferably the zener diode 115 has a break-over voltage of approximately 20 volts. Diode 116 is preferably a 1N4007 manufactured by Motorola, Incorporated and the resistor is preferably, 150 k ohms at one quarter watt. The zener diode 115 is connected with its anode to conducting path 84 and its cathode is connected to conducting path 89. The diode 116 has its anode terminal connected to conducting path 84 and its cathode connected to conducting path 88. The resistor 117 is connected between conducting path 83 and 88, thereby providing the circuit as shown in FIG. 4.

Hereinbefore has been disclosed a miniature station protector module, which is reliable, efficient and inexpensive to manufacture and includes an internal protective cover to prevent the solid state overvoltage protection device from becoming contaminated by contact with the potting compound. It will be understood that various changes in the details, materials, arrangement of parts and operating conditions, which have been herein described and illustrated in order to explain the nature of the invention, may be made by those skilled in the art within the principle and scope of the instant invention.

Having thus set forth the nature of the invention, what is claimed is:

1. A miniature station protector module for communication systems, comprising:

a) a hollow housing having a top surface and an open bottom;

b) a pair of line terminals and a ground terminal disposed in said housing top surface extending inside said hollow housing, said ground terminal being intermediate said pair of line terminals;

c) non-conductive printed circuit board means having conductive paths thereon, said board means being directly affixed to said pair of line terminals;

d) holding assembly means disposed on said printed circuit board means and affixed to said housing ground terminal within said hollow housing adapted to receive a surge arrester means;

e) surge arrester means disposed on said printed circuit board means within said holding assembly means having at least a pair of electrode terminals and a ground terminal, said surge arrester means ground terminal being in electrically conductive contact with said housing ground terminal via said holding assembly means, each one of said pair of surge arrester electrode terminals being in electrically conductive contact with one of said pair of line terminals;

f) protective housing means encompassing said surge arrester means and portions of said holding assembly means;

g) potting means adapted to fill said hollow housing for sealing said housing excluding the volume protected by said protective housing means; and h) heat sensitive material means disposed between said pair of electrode terminals and said ground terminal.

2. A miniature station protector module for communication systems according to claim 1, wherein said holding assembly means comprises:

a) first and second bracket means, each one of said bracket means extending towards one of said pair of line terminals insulated by said heat sensitive material from ground and connected with different conductive paths provided on said printed circuit board means in electrically conductive contact therewith; and b) third bracket means, said third bracket means being adapted to receive said surge arrester means and provide electrically conductive contact between said housing ground terminal and said surge arrester ground terminal.

3. A miniature station protector module for communication systems according to claim 1, wherein said surge arrester means is a solid state three terminal device having two independent breakdown paths.

4. A miniature station protector module for communication systems according to claim 1, further including line termination identification means disposed on said printed circuit board means.

* * * * *